United States Patent [19]

Karie

[11] 4,077,426

[45] Mar. 7, 1978

[54] FAUCET VALVE AND VALVE CARTRIDGE

[75] Inventor: Earl K. Karie, Detroit, Mich.

[73] Assignee: Brass Craft Manufacturing Company, Detroit, Mich.

[21] Appl. No.: 782,120

[22] Filed: Mar. 28, 1977

[51] Int. Cl.² .............................................. F16K 25/00
[52] U.S. Cl. ................................. 137/454.6; 251/174; 251/304
[58] Field of Search ........................... 137/454.6, 454.2; 251/174, 304, 120

[56] References Cited

U.S. PATENT DOCUMENTS

| 3,144,042 | 8/1964 | Glauber | 137/454.6 |
| 3,780,758 | 12/1973 | DeVries | 137/454.6 |
| 3,807,455 | 4/1974 | Farrell | 137/454.6 X |

Primary Examiner—Harold W. Weakley

Attorney, Agent, or Firm—Cullen, Settle, Sloman & Cantor

[57] ABSTRACT

A simple plastic valve cartridge and faucet valve utilizing a concentric metal pipe having an enlarged bore receiving the valve cartridge. The cartridge includes a cylindrical stationary valve member having an axially off-set inlet bore and an opposed axially projecting peripheral rim portion, a rotatable valve member having an inlet port axially off-set for communication with the port of the stationary valve member and a transverse outlet port, and an annular closure member having an axially projecting peripheral rim portion cooperating with the stationary valve member rim portion to define a cylindrical chamber receiving the rotatable valve member. The valve cartridge thus eliminates the requirement of complex machined metal parts while providing the anti-noise and flow features of the prior art.

10 Claims, 5 Drawing Figures

FAUCET VALVE AND VALVE CARTRIDGE

FIELD OF THE INVENTION

The present invention relates to non-rise faucet valves and valve cartridges of the type used primarily in dual inlet, single outlet faucets particularly designed for limiting noise.

U.S. Pat. Nos. 3,645,493 and 3,788,601 disclose alternative faucet valves of the type disclosed herein having a rotatable valve or spool member which rotates to open and close the valve. This type of valve is now preferred over the older compression valves which require periodic replacement of the valve seal and is relatively noisy in operation. The non-rise faucet valves disclosed by the prior art are, however, relatively complex in construction, requiring complex machined metal components.

The faucet valve of the present invention utilizes a concentric metal tube housing which requires very little machining and is, therefore, less expensive than the prior art. Further, the valve cartridge is composed of plastic parts, eliminating the requirement of machined metal cartridge components.

SUMMARY OF THE INVENTION

The faucet valve of the present invention utilizes a metal pipe or tube as the valve housing and a valve cartridge comprised of interfitting plastic parts. The tubular metal housing includes a first cylindrical inlet bore and a larger cylindrical bore concentric and communicating with a first bore defining an annular shoulder between the bores. The metal housing may thus be easily and inexpensively formed from commercially available materials.

The valve cartridge includes a stationary cylindrical valve member which is received in the tubular housing against the annular shoulder, a rotatable cylindrical valve member received against the stationary valve member having a axially projecting stem portion and a fixed annular closure member encircling the stem portion and retaining the rotatable and stationary valve members within the housing. The stationary valve member includes an axially off-set inlet bore in the body portion which receives fluid from the inlet bore of the tubular housing and a larger outlet bore or counterbore concentric with the off-set inlet bore. The rotatable valve member includes a cylindrical body or spool portion having an axially off-set inlet port which may be aligned with the outlet bore of the stationary valve member and a transverse radial outlet port through the cylindrical side of the rotatable valve member. In the disclosed embodiment, the rotatable valve member includes an axially projecting stem portion which is integral with the cylindrical body portion and the annular closure member is received over the stem portion, retaining the rotatable and stationary valve members in the housing.

In the preferred embodiment of the valve cartridge, the annular closure member and the stationary member include opposed projecting annular rims or lip portions which, in combination, define a cylindrical housing which receives the cylindrical body portion of the rotatable valve member. The outlet port is defined through the rim portion of the stationary member, providing communication to the spout when the inlet bore of the stationary valve member is in communication with the inlet port of the rotatable valve member. An annular sealing member is received in the counterbore of the stationary valve member sealing the communication between the stationary and rotatable valve members.

The faucet valve and cartridge of the present invention thus simplifies the valve construction of the prior art, eliminating the requirement for complex specially machined metal parts and providing a relatively simple, inexpensive cartridge assembly. Other advantages and meritorious features of the present invention will be more fully understood from the following Description of the Preferred Embodiments, the appended Claims, and the drawings, a brief description of which follows.

DESCRIPTION OF THE PREFERRED EMBODIMENTS

Figure 1:
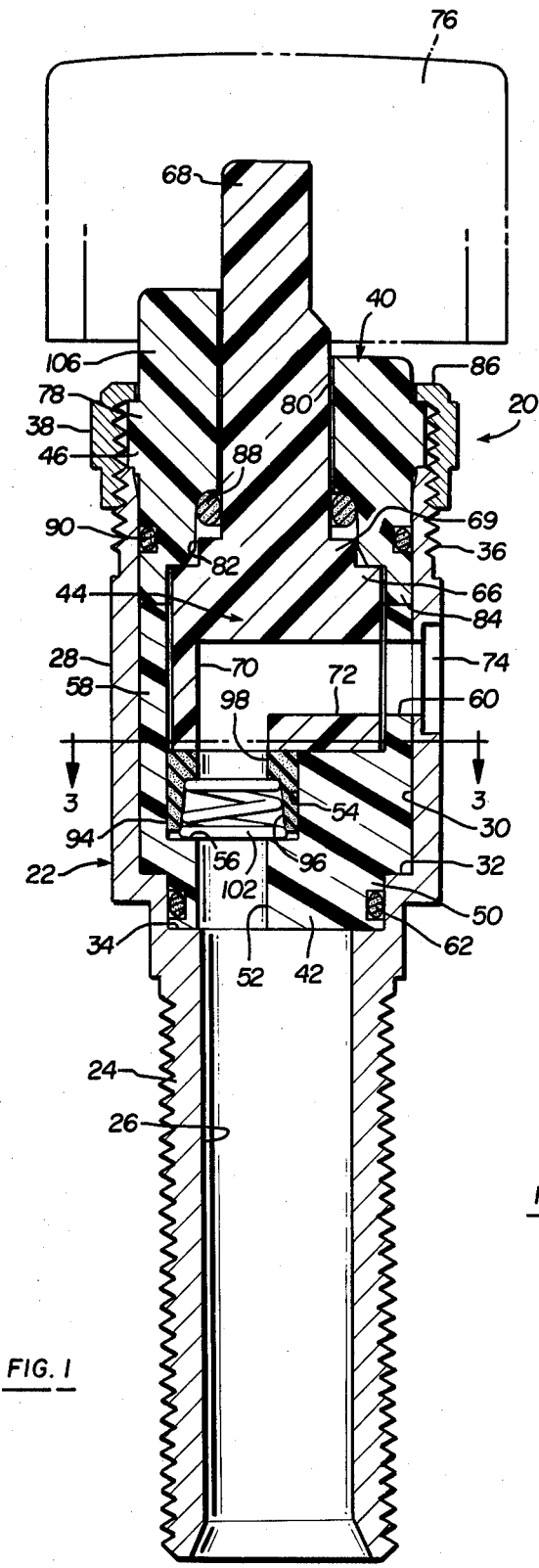
FIG. 1 is a side cross-sectional view of one embodiment of the faucet valve and cartridge of the present invention.
Figure 2:
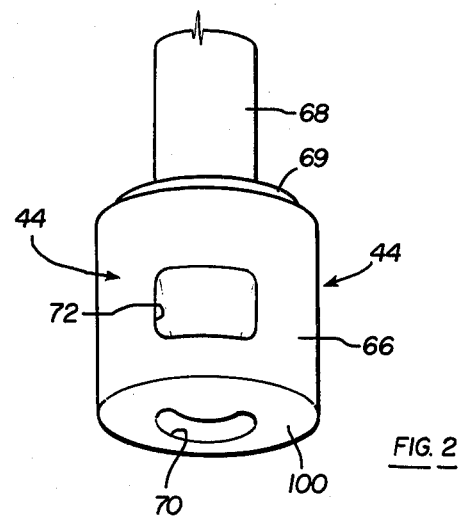
FIG. 2 is a side elevation of the rotatable valve member, one element of the faucet valve and cartridge shown in FIG. 1.

The faucet valve 20 shown in FIGS. 1 to 5 may be used in general applications, such as where a separate valve is utilized for the hot and cold water lines. Generally, such valves discharge into a common spout, not shown. The disclosed valve may also be used in the single handle faucet designs such as disclosed in U.S. Pat. No. 3,372,710. As described above, the present design is simpler and less expensive to build than the faucet designs disclosed in the above referenced prior art patent.

The metal housing or spud 22 includes an externally threaded end portion 24 for threaded connection to the hot or cold water line. The housing includes a cylindrical inlet bore 26 and an enlarged diameter portion 28 which defines a cylindrical housing chamber 30 and a pair of spaced annular shoulders 32 and 34. The end 36 of the housing portion is externally threaded to threadably receive the retainer or bonnet nut 38 which retains the valve cartridge 40 in the housing chamber 30 as described hereinbelow.

The valve cartridge 40 includes a stationary valve member 42, a rotatable valve member or stem 44 and a closure member or bonnet 46. The stationary valve member includes a stepped end portion 50 which is supported on the housing shoulders 32 and 34. Anti-rotation means such as a mechanical interlock between the housing and the stationary valve member 42 may also be provided where required by the materials. The stationary valve member includes a cylindrical inlet bore 52 which communicates with an enlarged cylindrical counterbore or outlet bore 54. A shoulder 56 is defined between the inlet and outlet bores. As described more fully hereinbelow, the concentric inlet and outlet bores are off-set relative to the axes of the stationary valve member 42 and the housing chamber 30. The stationary valve member also includes an integral annular rim or lip 58. The annular rim is concentric with the cylindrical body portion as shown in FIG. 1 and includes a cylindrical external surface aligned with the external surface of the body portion and a cylindrical internal surface which receives the rotatable valve member 44 as described below. A generally circular outlet port 60 is defined through the rim 58 which communicates with the inlet port of the rotatable valve member as described below. In the disclosed embodiment, an O-ring 62 is provided in the stepped end 50 of the stationary valve member to seal the space between the exterior of the valve cartridge and the interior of the housing chamber.

The rotatable valve member or stem 44 includes an enlarged cylindrical end or spool portion 66, an integral stem portion 68 and a step portion 69 therebetween. The spool portion includes a configured inlet port 70 which communicates with a transverse outlet port 72. The inlet port 70 is off-set relative to the axes of the cylindrical spool portion 66 and the housing chamber 30 a distance equal to the off-set of the inlet and outlet bores, 52 and 54 respectively, of the stationary valve member 42 such that the rotatable valve member may be rotated into communication between the outlet bore 54 of the stationary valve member and the inlet port 70 of the rotatable valve member as described hereinbelow.

When this communication is established, the outlet port 72 is in communication with the outlet ports 60 of the rim portion 58 and 74 of the housing as shown in FIG. 1. The distal end of the integral stem portion 68 may be configured to receive a handle or knob 76 as described below.

The annular closure member or bonnet 46 includes a radial shoulder portion 78 which receives the bonnet nut 38, a cylindrical internal wall 80 which receives the cylindrical stem portion and a step portion 82 which receives the step portion 69 of the rotatable valve member 44. In the preferred embodiment, the closure member includes an integral annular peripheral rim portion 84 which is concentric with the rim portion 58 of the stationary valve member. The opposed rims thereby define a cylindrical chamber which rotatably receives the cylindrical spool portion 66 of the rotatable valve member 44.

The interlocking design of the elements of the valve cartridge 40, including the opposed rim portions provide a complete enclosed assembly which is easy to assemble and install in the housing. In the disclosed embodiment, the cartridge is retained in the housing by a retainer or bonnet nut 38 which is internally threaded to be threadably received on the externally threaded body portion 36 and which includes an annular lip 86 which engages the shoulder 78 of the closure member or bonnet to securely retain the valve cartridge in place. O-rings 88 and 90 are provided between the bonnet 46, the internal housing wall and the stem portion to prevent leakage between the surfaces.

In the disclosed embodiment, the communication between the stationary valve member 42 and the rotatable valve member 44 is sealed by an annular sealing member 94. The sealing member includes a cylindrical external surface which is received within the outlet bore or counterbore 54 of the stationary valve member, a conical inlet opening 96 and a cylindrical outlet 98. The sealing member is resiliently biased against the flat end face 100 of the rotatable valve member spool portion by a coil spring 102. The spring is biased against the shoulder 56 of the stationary valve member and received within the conical inlet opening 96. The sealing member thus seals the communication between the stationary and rotatable valve members, 42 and 44 respectively.

Figure 3:
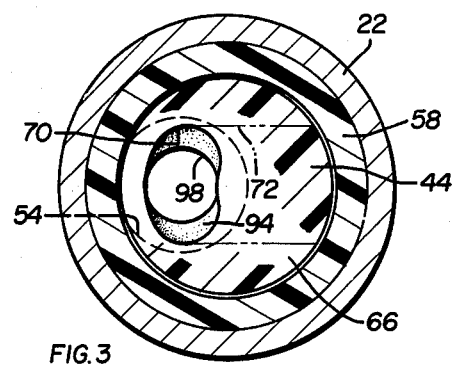
FIG. 3 is a top cross-sectional view of the faucet valve disclosed in FIG. 1, in the direction of view arrows 3—3.

The operation of the valve is, therefore, as follows. Hot or cold water enters the spud through cylindrical opening 26. As described above, the threaded and 24 of the spud is secured to either the hot or cold water line by conventional means. Where the valve is open as shown in FIGS. 1 and 3, the water flows unobstructed through the inlet bore 52 of the stationary valve member 42, through outlet bore 98 into inlet port 70 of the rotational valve member 44. Finally, the water flows through outlet ports 72, 60 and 74 of the rotational valve member, the rim portion 58 of the stationary valve member and the housing, respectively. It will be understood that the outlet port 74 of the housing is normally connected to a tube or pipe which is connected to the spout of the faucet.

Figure 4:
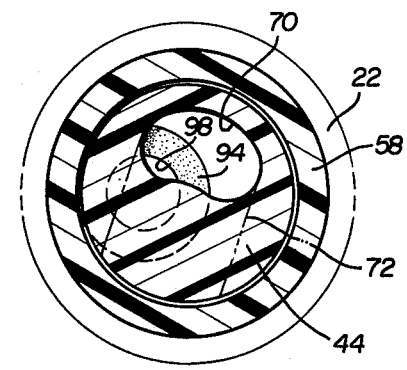
FIG. 4 is the cross-sectional view of FIG. 3 with the rotatable valve member rotated slightly more than 90°.
Figure 5:
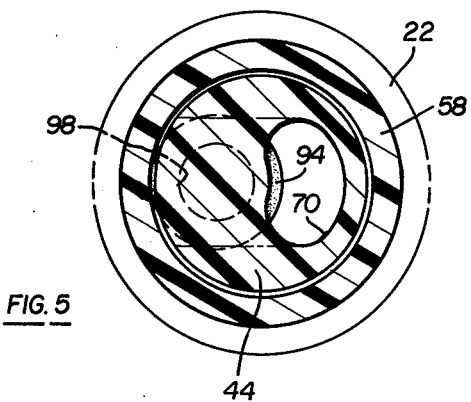
FIG. 5 is the cross-sectional view of FIG. 3 with the rotatable valve member rotated about 180°.

FIGS. 4 and 5 illustrate the operation of the disclosed valve. In FIG. 4, the rotatable valve member 44 has been rotated in a clock-wise direction about 110 degrees relative to FIGS. 1 and 2. The kidney-shaped inlet port 70 is nearly out of communication with the cylindrical outlet port 98 of sealing member 94. The valve in FIG. 4 is thus nearly closed. It should be noted, however, that the kidney shape of the inlet port 70 provides a more uniform change in the flow rate and limits noise as described in the above-referenced U.S. Pat. No. 3,645,493. Where a kidney-shaped inlet port is utilized, the outlet port 72 preferably has a similar configuration to prevent an abrupt change in the flow pattern. In the disclosed embodiment, the outlet port 72 is generally rectangular with rounded corners. The outlet port 60 and 74 may then approach a circular shape for laminer flow through the pipe or tube to the spout. The inlet and outlet ports, 70 and 72 respectively, may also be cylindrical, which configuration is simpler and less expensive to form.

Finally, in FIG. 5, the rotatable valve member 44 has been rotated 180 degrees from the position shown in FIGS. 1 and 3. The valve is now completely closed and the sealing member 94 seals outlet port 98. In the disclosed embodiment, the closure member or bonnet 46 includes a stop portion 106 which is engaged by a complimentary portion of the handle 76 (not shown) to prevent over-rotation of the handle. This is not a unique feature of the present valve and, therefore, the handle and stop has not been shown or described in detail.

As described above, the components of the valve cartridge 40 are all preferably formed of plastic materials. The O-rings 62, 88 and 90 and the sealing member 94 may all be formed of natural or synthetic rubber, as is customary in sealing applications. The valve cartridge components including the stationary valve member 42, the rotatable valve member 44 and the closure member are preferably formed of a relatively tough, solvent resistent plastic which does not exhibit slip-stick characteristics. A suitable material is an acetal copolymer, such as "Celcon," a trademark of Celanese Plastics Co. Acetal copolymer resins are prepared by copolymerization of trioxane with small amounts of comonomer which randomly distribute carbon-carbon bonds in the polymer chain. Acetal copolymers are supplied in a wide variety of formulations ranging from easy melt-flow injection grades to a high molecular weight extrusion grade. Celcon M 90 which is a standard injection molding grade, which is very satisfactory. Other materials may also be utilized including filled fluorocarbons, such as filled nylon plastics. The spud may be formed of any suitable material including brass and ferrous metals.

It will be understood that the faucet valve and cartridge disclosed in FIGS. 1 to 5 may be modified without departing from the purview of the appended claims. For example, the inlet and outlet ports, 70 and 72 respectively, of the rotatable valve member may be cylindrical. Anti-rotation means may be provided between the stationary and closure valve members 42 and 46 respectively and between these members and the housing 28. Alternative sealing means may also be utilized.

I claim:

1. A faucet valve, comprising:
   a metal housing having a concentric axial bore including an internal annular shoulder,
   a cylindrical stationary plastic valve member within said housing on said shoulder having an axially off-set inlet bore and an enlarged outlet counterbore coaxially aligned with said inlet bore,
   a rotatable cylindrical plastic valve member within said housing having a body portion rotatably engaging said stationary valve member including the opening to said counterbore having an inlet port equally offset and alignable for communication with said stationary member outlet counter bore, a transverse outlet port communicating with said inlet port and said rotatable valve member having an integral axially projecting stem portion,
   an annular resilient sealing member within said stationary valve member counterbore resiliently biased against said rotatable valve member, sealing the communication between said stationary and rotatable valve member, and
   an annular plastic closure member within said housing received over said rotatable member portion, retaining said rotatable member within said housing.

2. The faucet valve defined in claim 1, characterized in that said stationary valve member includes an axially projecting annular lip adjacent the periphery of said stationary member and said rotatable valve member rotatably received within said lip.

3. The faucet valve defined in claim 2, characterized in that said stationary member lip extends beyond the outlet portion of said rotatable valve member and includes an outlet port communicating with the outlet port of said rotatable valve member.

4. The faucet valve defined in claim 1, characterized in that said stationary and closure members have opposed peripheral rim portions defining an internal cylindrical chamber, and said rotatable valve member located within said chamber and supported for rotational movement about the axis of said stem portion.

5. The faucet valve defined in claim 1, characterized in that said rotatable valve member inlet port is kidney-shaped and the outlet port is generally rectangular.

6. A faucet valve, comprising:
   a tubular metal housing having a first cylindrical inlet bore communicating with a larger cylindrical bore concentric with said first bore and defining an annular shoulder therebetween,
   a stationary cylindrical plastic valve member located within said second housing bore against said housing shoulder having an axially off-set inlet bore receiving fluid from said first housing bore and a larger outlet counterbore concentric with said off-set inlet bore,
   a rotatable cylindrical valve member having an enlarged end portion within said second housing bore against said stationary valve member having an axially off-set inlet port rotatable relative to said housing into coaxial communication with said stationary member counter bore, a transverse outlet port and an axially projecting cylindrical stem portion,
   an annular sealing member located within said stationary valve member counterbore sealing the communication between said stationary and rotatable valve members, and
   a fixed annular closure member within said housing second bore encircling said stem portion and retaining said rotatable and stationary valve members within said housing.

7. The faucet valve defined in claim 6, characterized in that said stationary and closure members have axially projecting annular rim portions adjacent their peripheries receiving said enlarged rotatable valve member portion and having a transverse outlet port communication through said rotatable valve member with inlet port.

8. The faucet valve defined in claim 6, characterized in that said annular sealing member has a first conical inlet port and a second cylindrical outlet port defining a shoulder and said sealing member biased against said rotatable valve member by an annular spring received within said conical inlet port.

9. A faucet valve cartridge, comprising, in combination:
   a first stationary cylindrical plastic valve member having an axially off-set inlet bore through one axial end communicating with a larger concentric outlet bore through the opposed end of said stationary valve member and an axially projecting annular peripheral rim encircling said opposed valve member end,
   a second rotatable plastic valve member having an enlarged cylindrical end portion received within said stationary valve member rim portion having an inlet port axially off-set to communicate with said stationary valve member outlet bore upon rotational alignment, said rotational valve member having an axially projecting integral stem portion, and
   a third annular retainer plastic valve member encircling said rotational valve member stem portion having a peripheral rim portion projecting toward said stationary valve member rim portion and enclosing said rotatable valve member, and said opposed rim portions having a radial outlet port communicating with said rotational valve outlet port.

10. The valve cartridge defined in claim 9, characterized in that said stationary valve member outlet bore includes a spring biased annular sealing member sealing the communication between said stationary valve member and said rotatable valve member.

* * * * *